(12) United States Patent
Sandler

(10) Patent No.: US 7,378,013 B2
(45) Date of Patent: May 27, 2008

(54) GOOSENECK TRAILER COUPLER

(75) Inventor: Philip Sandler, Mayfield Village, OH (US)

(73) Assignee: Buyers Products Company, Mentor, OH (US)

( * ) Notice: Subject to any disclaimer, the term of this patent is extended or adjusted under 35 U.S.C. 154(b) by 267 days.

(21) Appl. No.: 11/227,048

(22) Filed: Sep. 15, 2005

(65) Prior Publication Data
US 2007/0069502 A1    Mar. 29, 2007

(51) Int. Cl.
*B60D 1/60* (2006.01)
(52) U.S. Cl. .................. 208/507; 280/511; 280/512; 280/514; 280/508; 280/509; 280/510; 280/441.2
(58) Field of Classification Search ........... 280/511, 280/507, 512, 514, 508, 509, 441.2
See application file for complete search history.

(56) References Cited

U.S. PATENT DOCUMENTS

| | | | |
|---|---|---|---|
| 5,263,735 A | 11/1993 | Mann | 280/512 |
| 5,382,109 A | 1/1995 | Nyman | 403/316 |
| 5,385,363 A | 1/1995 | Morey | 280/511 |
| 5,482,309 A | 1/1996 | Hollis | 280/423.1 |
| 5,683,094 A * | 11/1997 | Gullickson | 280/485 |
| 6,234,509 B1 | 5/2001 | Lara | 280/425.2 |
| 6,315,315 B1 * | 11/2001 | Seale | 280/507 |
| 6,464,241 B1 | 10/2002 | Daniel | 280/512 |
| 6,467,793 B2 | 10/2002 | Putnam | 280/508 |
| 6,588,790 B2 | 7/2003 | Hall | 280/513 |
| 7,192,047 B2 * | 3/2007 | Sauermann | 280/509 |
| 2005/0179233 A1 * | 8/2005 | Hogan | 280/507 |

* cited by examiner

*Primary Examiner*—Lesley D. Morris
*Assistant Examiner*—Marlon Arce-Diaz
(74) *Attorney, Agent, or Firm*—Kusner & Jaffe

(57) ABSTRACT

A coupler comprised of a coupler housing having a first opening formed therein. The opening has a concave cavity. A cylindrical socket is formed within the housing. A second opening in the housing communicates with the cylindrical socket. A lock ring is provided, the lock ring having a cylindrical portion and an arm portion extending therefrom. The cylindrical portion of the lock ring is disposed within the cylindrical socket in the housing with the arm portion extending from the housing through the second opening. An opening is formed through the cylindrical portion of the lock ring. The cylindrical portion of the lock ring is rotatable in the cylindrical socket wherein the lock ring is movable between a first position wherein the opening in the lock ring is aligned with the concave cavity to allow a tow ball to be inserted into the concave cavity through the opening in the lock ring and a second position wherein the opening is not in alignment with the concave cavity.

26 Claims, 5 Drawing Sheets

GOOSENECK TRAILER COUPLER

FIELD OF THE INVENTION

The present invention relates generally to a coupler device, and more particularly, to a coupler device for connecting a trailer to a ball-type hitch on a towing vehicle.

BACKGROUND OF THE INVENTION

Many types of coupling devices have been developed for providing connection between a towing vehicle and a towed vehicle. Such connections often include a shaft-mounted, ball-type hitch, conventionally referred to as a tow ball that is generally attached to the towing vehicle. A coupler attached to the towing vehicle cooperates with the tow ball to complete the connection.

One known type of towing hitch uses a long, vertical sheathing having a coupler attached to the lower end thereof. This type of hitch is sometimes known as a "gooseneck" or "neck over" coupler.

The present invention relates to an improved coupler device for connecting a gooseneck trailer hitch to a ball-type hitch on a towing vehicle.

SUMMARY OF THE INVENTION

In accordance with a preferred embodiment of the present invention, there is provided a coupler for securing a trailer to a vehicle having a tow hitch ball. The coupler is comprised of a coupler housing having a first opening formed therein. The opening has a concave cavity for receiving a tow ball. A cylindrical socket is formed within the housing. A second opening in the housing communicates with the cylindrical socket. A lock ring is provided, the lock ring having a cylindrical portion and an arm portion extending therefrom. The cylindrical portion of the lock ring is disposed within the cylindrical socket in the housing with the arm portion extending from the housing through the second opening. An opening is formed through the cylindrical portion of the lock ring. The cylindrical portion of the lock ring is rotatable in the cylindrical socket wherein the lock ring is movable between a first position wherein the opening in the lock ring is aligned with the concave cavity to allow a tow ball to be inserted into the concave cavity through the opening in the lock ring and a second position wherein the opening is not in alignment with the concave cavity.

In accordance with another embodiment of the present invention, there is provided a coupler for securing a trailer to a vehicle having a tow hitch ball. The coupler is comprised of a first coupler section comprised of a generally concave cavity for receiving a tow ball, a cylindrical socket larger than the cavity communicating with the concave cavity and an opening extending to one side of the cylindrical socket. A plate-like lock ring is provided, the lock ring having a circular portion with an opening therethrough and an arm portion extending to one side of the circular portion. The circular portion of the lock ring is dimensioned to be matingly received within the cylindrical socket with the arm portion extending through the opening. The lock ring is rotatable in the socket between a first position wherein the opening in the lock ring is aligned with the concave cavity to allow a tow ball to be inserted therein through the opening, and a second position wherein the opening is out of alignment with the concave cavity. A second coupler section is attached to the first housing section to capture the lock ring in the cylindrical socket.

An advantage of the present invention is a coupler device for connecting a trailer to a towing vehicle.

Another advantage of the present invention is a coupler device as described above that releasably secures the coupler device to a tow ball.

Another advantage of the present invention is a coupler device as described above having a locking mechanism that automatically locks into a tow ball retaining position when the locking mechanism is in a locked position.

Another advantage of the present invention is a coupler device as described above that requires minimal effort to connect and disconnect the coupler to a tow ball.

Another advantage of the present invention is a coupler device as described above that has a rugged, simple construction.

Yet another advantage of the present invention is a coupler device as described above that may be attached to a tubular, cylindrical or rectangular shank of a gooseneck-towing hitch.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
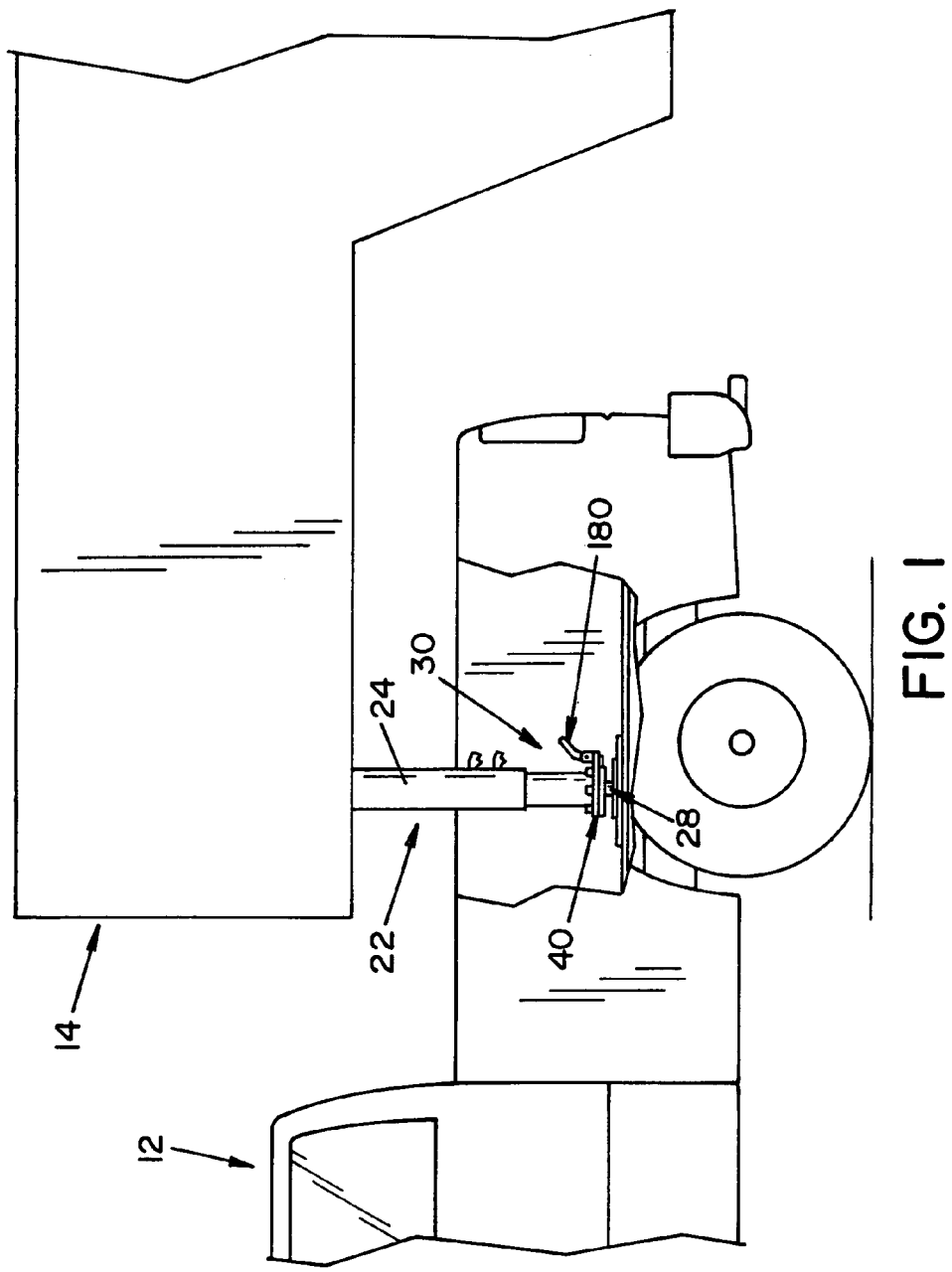
FIG. 1 is a pictorial view of a towing vehicle and a trailer vehicle having a gooseneck towing hitch.

Referring now to the drawings wherein the showings are for the purpose of illustrating a preferred embodiment of the invention only, and not for the purpose of limiting same, FIG. 1 shows a towing vehicle 12 and a towed vehicle 14 connected by a "gooseneck" or "neck over" towing hitch 22.

Figure 2:
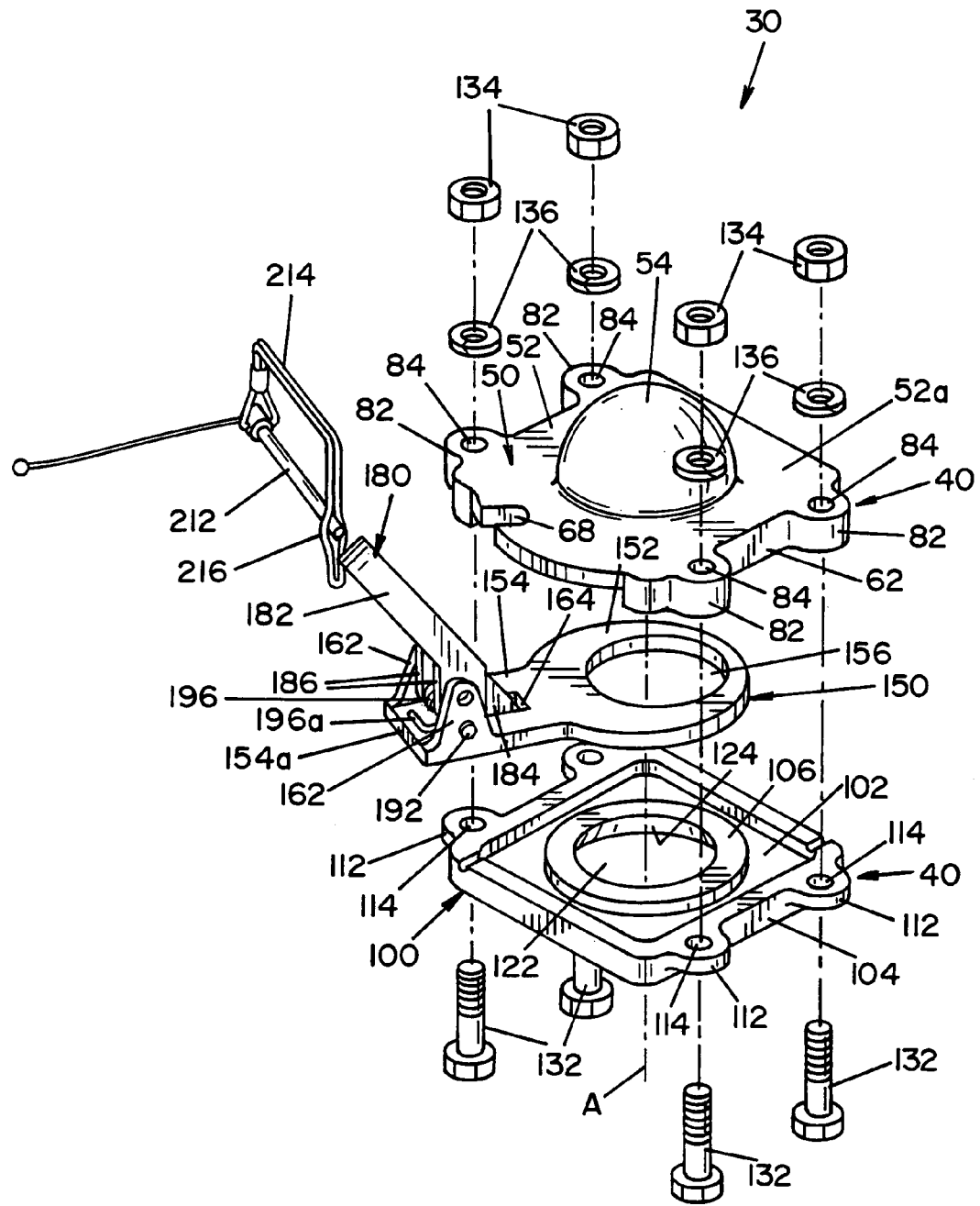
FIG. 2 is an exploded view of a coupler for use with the gooseneck towing hitch shown in FIG. 1.

An elongated, vertical sheathing member 24 is attached to towed vehicle 14 and extends downward therefrom. Sheathing member 24 is tubular in shape, and is typically formed from a cylindrical or rectangular steel pipe. The sheathing member may be designed to be capable of telescoping (not shown) to allow extension and contraction thereof. A coupler 30, best seen in FIG. 2, is provided for attachment to the lower end of sheathing member 24 to connect sheathing member 24 and towed vehicle 14 to a tow hitch ball (tow ball) 28, best seen in FIG. 3, that is mounted to the bed of towing vehicle 12. Tow ball 28 has a spherical portion 28*a* and a neck portion 28*b*.

Broadly stated, coupler 30 is comprised of a housing 40, a lock ring 150 that is movable within housing 40, and a locking element 180.

Figure 3:
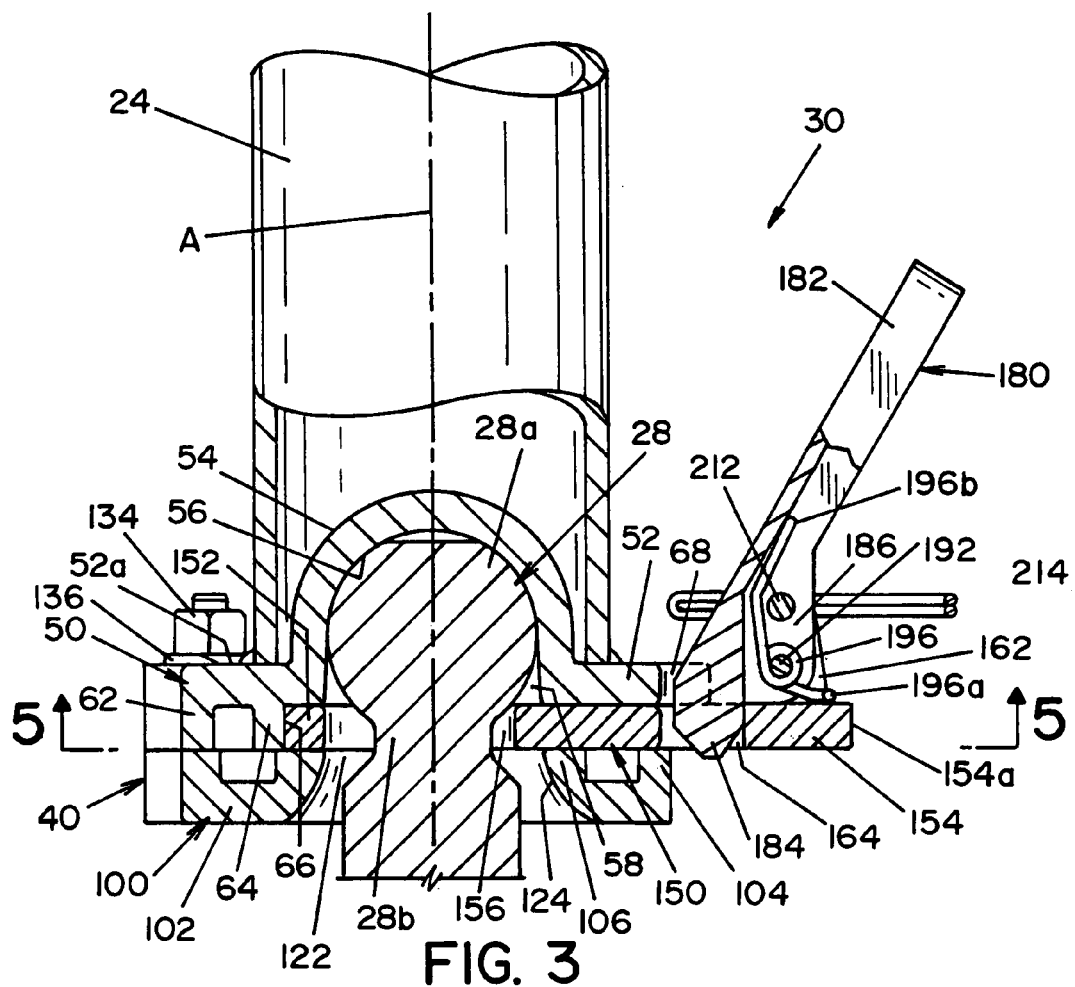
FIG. 3 is a sectioned, elevational view taken through the coupler assembly shown in FIG. 2.
Figure 4:
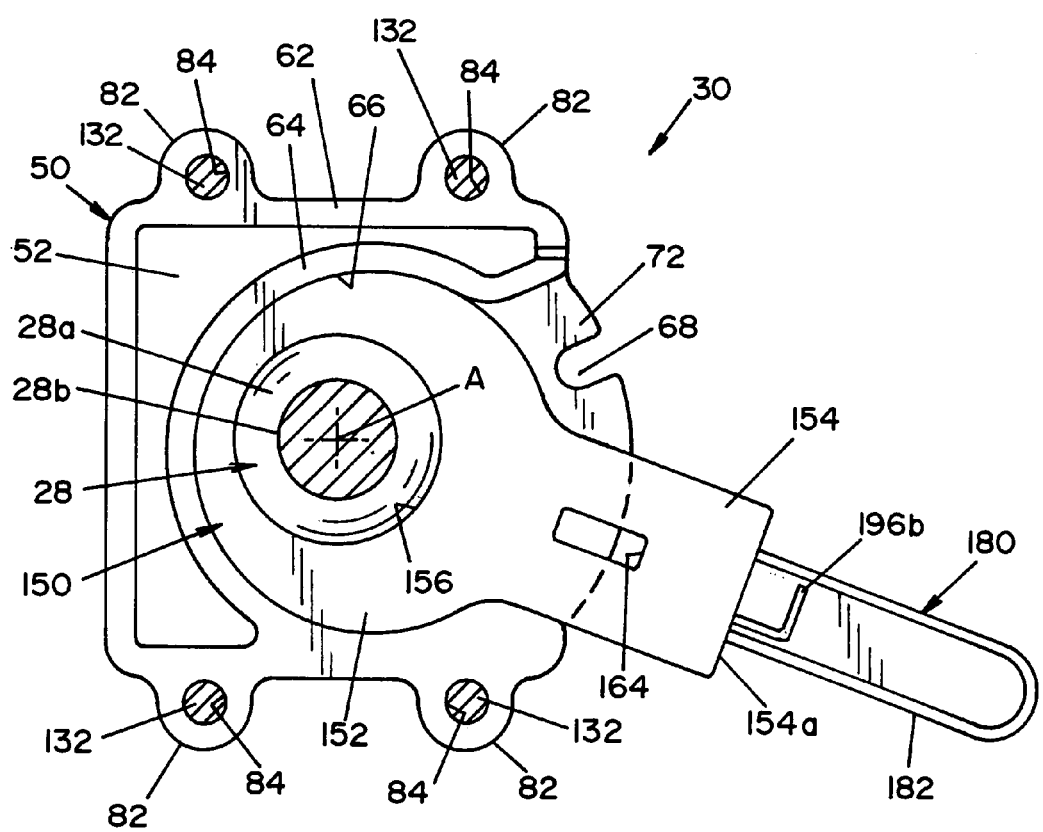
FIG. 4 is a sectional, bottom plan view taken below a lock ring of the coupler device, showing the lock ring in a first, unlocked position.

Housing 40 is comprised of a first housing section 50 and a second housing section 100. First housing section 50 has a flat, plate portion 52 and a central dome portion 54 that project upwardly from plate portion 52. Dome portion 54 has an internal, spherical bottom surface 56 that defines a generally spherical concave cavity 58, best seen in FIG. 3. Plate portion 52 has an upper planar surface 52*a* that surrounds dome portion 54. An outer wall 62 and an inner wall 64 extend downwardly from plate portion 52. Outer wall 62 extends about a major portion of the periphery of plate portion 52. Inner wall 64 is disposed within outer wall 62 and defines a cylindrical socket 66, best seen in FIG. 5, beneath plate portion 52 and dome portion 54. In the embodiment shown, inner wall 64 is joined to outer wall 62 and defines an opening 72 beneath plate portion 52, best seen in FIGS. 4 and 5. Opening 72 extends to one side of cylindrical socket 66. As best seen in FIG. 3, cylindrical socket 66 communicates with concave cavity 58. Outer wall 62 is formed to include spaced-apart fastener lugs 82. In the embodiment shown, four (4) fastener lugs 82 are formed about the periphery of first housing section 50. Lugs 82 have apertures 84 formed therethrough to receive fasteners, as shall be described below. A notch 68, best seen in FIG. 4, is formed in plate portion 52 adjacent opening 72.

Second housing section 100, best seen in FIG. 2, includes a generally rectangular plate portion 102, and an outer wall 104 and an inner wall 106 that extend upwardly from plate portion 102. Outer wall 104 includes spaced-apart fastener lugs 112 disposed about the periphery of second housing section 100. Fastener lugs 112 have apertures 114 formed therethrough. Fastener lugs 112 are disposed on second housing section 100 to be in registry with fastener lugs 82 on upper housing section 50. Inner wall 106 forms a circular socket opening 122 in second housing section 100. As best seen in FIG. 3, inner wall 106 has a frusto-conical inner surface 124.

Second housing section 100 is dimensioned to be attached to first housing section 50. In the embodiment shown, conventional bolts 132, nuts 134 and lock washers 136 are used to secure first housing section 50 to second housing section 100. As illustrated in the drawings, bolts 132 extend through apertures 84, 114 in fastener lugs 82, 112 of housing sections 50, 100. As best seen in FIG. 3, socket opening 122 in second housing section 100 is aligned with concave cavity 58 in first housing section 50 along an axis, designated "A" in the drawings. Socket opening 122 in second housing section 100 is dimensioned similarly to concave cavity 58 in first housing section 50. In this respect, housing 40 has a vertically oriented axis "A" and a recessed socket with a downwardly directed socket opening 122 for receiving a tow ball. Frusto-conical surface 124 on second housing section 100 defines a throat into conical cavity 58, through which a tow ball may be inserted in a conventionally known manner.

Referring now to FIG. 2, lock ring 150 is best seen. Lock ring 150 includes a flat, circular portion 152 and an arm portion 154 that extends to one side of circular portion 152. Circular portion 152 has a circular aperture 156 formed therein. Aperture 156 has dimensions similar to socket opening 122 of second housing section 100 and concave cavity 58 in first housing section 50.

Figure 5:
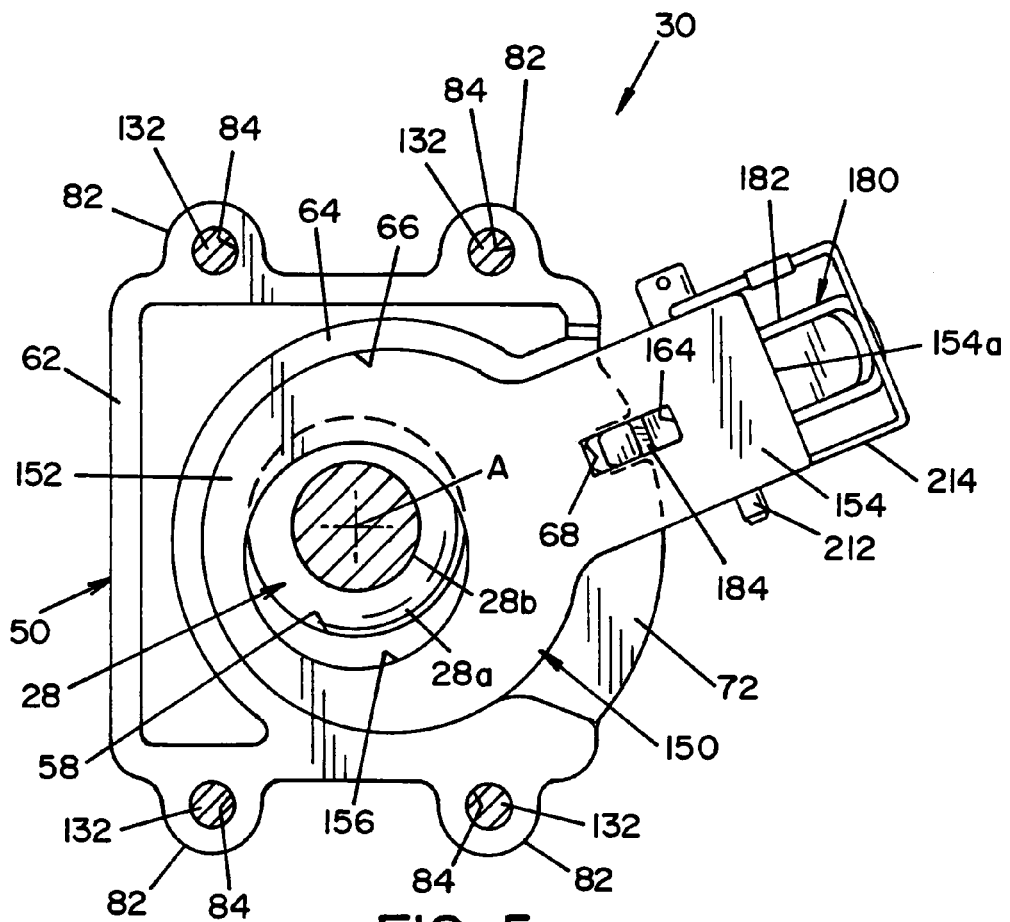
FIG. 5 is a sectional, bottom plan view, taken along line 5-5 of FIG. 3, showing the lock ring in a "locked" position.

Arm portion 154 is dimensioned to extend from the flat, circular portion 152. Arm portion 154 has a free end 154*a* that includes spaced-apart, upwardly extending brackets 162. A slot 164, best seen in FIGS. 4 and 5, is formed in arm portion 154.

Locking element 180 is an elongated member having a handle portion 182 at one end and a locking tab or finger portion 184 at the other end. Locking element 180 further includes spaced-apart side walls 186 that are disposed between tab or finger portion 184 and handle portion 182. Locking element 180 is mounted to arm portion 154 of lock ring 150 by a pin 192 that extends through brackets 162 on arm portion 154 and walls 186 on locking element 180. A biasing element 196 biases locking element 180 toward a position, best seen in FIG. 3, wherein tab or finger portion 184 extends into slot 164 in arm portion 154 of lock ring 150. In the embodiment shown, biasing element 196 is a coil spring that surrounds pin 192.

Spring 196 has a first end 196*a* that engages arm portion 154 and a second end 196*b* that engages handle portion 182 of locking element 180.

The position shown in FIG. 3 represents a locked position, as shall be described in greater detail below. A safety pin 212 is provided to secure locking element 180 in the locked position shown in FIG. 3. Safety pin 212 extends through holes in walls 186 of locking element 180 and brackets 162 in arm portion 154 of lock ring 150, which holes align when locking element 180 is in the locked position, as shown in FIG. 3. Safety pin 212 includes a latch wire 214 attached to one end of saftey pin 212. Latch wire 214 includes a clasp 216 formed at the free end thereof to capture the free end of safety pin 212, when safety pin 212 is used to lock locking element 180 in the locked position.

First and second housing sections 50, 100, lock ring 150 and locking element 180 are preferably formed by casting. In one preferred embodiment, each component is formed of at least 10/45 medium carbon steel. Casting permits tight tolerance to be cast into each of the foregoing components.

Coupler 30 shall now be further described with respect to the use and operation thereof. Coupler 30 is designed for attachment to the lower end of sheathing member 24. As schematically illustrated in FIG. 3, the lower end of tubular, sheathing member 24 is attached to housing 40 preferably by welding. As indicated in FIG. 3, the wall portion of sheathing member 24 surrounds and receives dome portion 54 of first housing section 50. Planar surface 52*a* of first housing section 50 provides a flat surface for abutting engagement with the lower end of tubular, sheathing member 24. Sheathing member 24 is welded to first housing section 50, as illustrated in FIG. 3.

Lock ring 150 is movable within coupler housing 40 between a first, tow-ball receiving position and a second, tow-ball locking position.

When lock ring 150 is in the second, locked position, tab portion 184 of locking element 180 extends through notch 68 in first housing section 50 and extends into slot 164 in arm portion 154 of lock ring 150, as shown in FIG. 3. In this position, the movement of lock ring 150 is prevented by engagement of locking element 180 with first housing section 50. In other words, notch 68 in plate portion 52 of first housing section 50 captures locking element 180 thereby preventing rotation of lock ring 150 within coupler housing 40. To release lock ring 150, safety pin 212 must be removed and handle 182 of locking element 180 pivoted downwardly until tab portion 184 is above upper surface 52*a* of plate portion 52 of first housing section 50.

Referring to FIG. 4, lock ring 150 is shown in the first position, wherein circular aperture 156 in lock ring 150 is aligned with concave cavity 58 in first housing section 50. In this position, aperture 156 is also aligned with socket opening 122 in second housing section 100. With lock ring 150 in the first position, a tow ball may be received within housing 40 of coupler 30. Once a tow ball is within coupler housing 40, i.e., within concave cavity 58, lock ring 150 is rotated to a second, locked position, as illustrated in FIG. 5. In this second, locked position, aperture 156 in circular portion 152 of lock ring 150 has moved to a position wherein one side of aperture 156 in circular portion 152 of lock ring 150 restricts socket opening 122 in coupler housing 40. In other words, aperture 156 in lock ring 150 is shifted to one side of the opening in coupler housing 40, thereby confining spherical portion 28a of tow ball 28 to concave cavity 58 in first housing section 50. The present invention thus provides a compact, rigid coupler 30 for connecting a gooseneck coupler to a tow hitch.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A coupler for securing a trailer to a vehicle having a tow hitch ball, said coupler comprising:
   a first coupler section comprised of a generally concave cavity for receiving a tow ball, a cylindrical socket larger than said cavity communicating with said concave cavity and an opening extending to one side of said cylindrical socket;
   a lock ring having a circular portion with an opening therethrough and an arm portion extending to one side of said circular portion, said circular portion of said lock ring being dimensioned to be matingly received within said cylindrical socket with said arm portion extending through said opening, said lock ring being rotatable in said socket between a first position wherein said opening in said lock ring is aligned with said concave cavity to allow a tow ball to be inserted therein through said opening, and a second position wherein said opening is out of alignment with said concave cavity; and
   a second coupler section attached to said first housing section to capture said lock ring in said cylindrical socket.

2. A coupler as defined in claim 1, wherein said first coupler section includes a planar, outer surface for attachment to an end of a tubular member on a gooseneck hitch.

3. A coupler as defined in claim 1, further comprising a locking device for locking said lock ring in said second position.

4. A coupler as defined in claim 3, wherein said locking device includes a locking element mounted to said lock ring, said lock element movable between a lock position preventing movement of said lock ring and a release position.

5. A coupler as defined in claim 4, wherein said locking element is received in a recess in said first coupler section when in said lock position.

6. A coupler as defined in claim 4, wherein said locking device includes a biasing device for biasing said locking device.

7. A coupler for securing a trailer to a vehicle having a tow hitch ball, comprising:
   a coupler housing having a first opening formed therein, said opening having a concave cavity for receiving a tow ball;
   a cylindrical socket within said housing;
   a second opening in said housing communicating with said cylindrical socket;
   a lock ring having a cylindrical portion and an arm portion extending therefrom, said cylindrical portion of said lock ring being disposed within said cylindrical socket in said housing with said arm portion extending from said housing through said second opening; and
   an opening formed through said cylindrical portion of said lock ring, said cylindrical portion of said lock ring being rotatable in said cylindrical socket wherein said lock ring is movable between a first position wherein said opening in said lock ring is aligned with said concave cavity to allow a tow ball to be inserted through said opening in said lock ring into said concave cavity and a second position wherein said opening is not in alignment with said concave cavity.

8. A coupler as defined in claim 7, wherein said housing is comprised of a first housing section and a second housing section.

9. A coupler as defined in claim 8, wherein said cylindrical socket is formed between said first housing section and said second housing section.

10. A coupler as defined in claim 9, wherein said concave cavity and said cylindrical socket are formed in said first housing section.

11. A coupler as defined in claim 10, wherein said second housing section includes an opening aligned with said concave cavity.

12. A coupler as defined in claim 7, wherein said opening extends along a first axis and has a throat portion at one end and said concave cavity at another end.

13. A coupler as defined in claim 12, wherein said cylindrical socket is disposed between said throat portion and said concave cavity.

14. A coupler as defined in claim 13, wherein said cylindrical socket is symmetrical about a second axis parallel to and offset from said first axis.

15. A coupler as defined in claim 14, wherein said housing is comprised of a first housing section having said concave cavity formed therein and a second housing section having said throat defined therein.

16. A coupler as defined in claim 14, wherein said first housing section includes a planar, outer surface for attachment to a post on a gooseneck hitch.

17. A coupler as defined in claim 7, further comprising a locking device for locking said lock ring in said second position.

18. A coupler as defined in claim 17, wherein said locking device includes a locking element mounted to said lock ring, said lock element movable between a lock position preventing movement of said lock ring and a release position.

19. A coupler as defined in claim 18, wherein said locking element is received in a recess in said housing in said lock position.

20. A coupler as defined in claim 19, wherein said locking device is pivotally mounted to said lock arm.

21. A coupler as defined in claim 20, wherein said locking device includes a handle and a tab (finger), said finger being insertable into a recess in said housing when said locking device is in said second position.

22. A coupler as defined in claim 18, wherein said locking device includes a biasing device for biasing said locking device.

23. A coupler as defined in claim 21, wherein said biasing device is a spring.

24. A coupler as defined in claim 21, wherein said locking device is pivotally mounted to said extension portion of said lock ring.

25. A coupler as defined in claim 24, wherein said locking device includes a handle and a tab (finger), said finger being insertable into a recess in said coupler when said locking device is in said second position.

26. A coupler as defined in claim 25, wherein said biasing device is a spring.

* * * * *